US012623221B2

(12) United States Patent
Squires et al.

(10) Patent No.: US 12,623,221 B2
(45) Date of Patent: May 12, 2026

(54) OBJECT DELIVERY SYSTEMS AND RELATED METHODS

(71) Applicant: THE REGENTS OF THE UNIVERSITY OF CALIFORNIA, Oakland, CA (US)

(72) Inventors: Todd Squires, Santa Barbara, CA (US); Huanshu Tan, Santa Barbara, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 546 days.

(21) Appl. No.: 18/024,455

(22) PCT Filed: Sep. 15, 2021

(86) PCT No.: PCT/US2021/050457
§ 371 (c)(1),
(2) Date: Mar. 2, 2023

(87) PCT Pub. No.: WO2022/060839
PCT Pub. Date: Mar. 24, 2022

(65) Prior Publication Data

US 2023/0285973 A1 Sep. 14, 2023

Related U.S. Application Data

(60) Provisional application No. 63/079,208, filed on Sep. 16, 2020.

(51) Int. Cl.
*B01L 3/00* (2006.01)

(52) U.S. Cl.
CPC . *B01L 3/502761* (2013.01); *B01L 2300/0874* (2013.01); *B01L 2400/0406* (2013.01); *B01L 2400/0472* (2013.01)

(58) Field of Classification Search
CPC ....... B01L 3/502761; B01L 2300/0874; B01L 2400/0406; B01L 2400/0472; B01J 13/025
See application file for complete search history.

(56) References Cited

U.S. PATENT DOCUMENTS

2019/0170685 A1 6/2019 Ault et al.

OTHER PUBLICATIONS

Li ("Electrically controllable cargo delivery with dextran-rich droplets") Journal of Colloid and Interface Science 582 (2021) 102-111 (Year: 2021).*

(Continued)

*Primary Examiner* — Jennifer Wecker
*Assistant Examiner* — Jonathan Bortoki
(74) *Attorney, Agent, or Firm* — Billion & Armitage

(57) ABSTRACT

Embodiments include an object delivery system that may include a solute selected to diffuse through at least a portion of a porous material to a target and to associate with the target to form a source beacon capable of generating a solute outflux; and an object to be delivered to the target, wherein the solute outflux causes the object to migrate towards the target. Embodiments further include a method of using an object delivery system that may include one or more of the following steps: loading a target with a solute to form a source beacon, wherein the target is located within a porous material; releasing the solute from the source beacon to produce a solute outflux, wherein the solute outflux causes an object to migrate towards the target; and reloading the target with solute one or more times to form one or more additional source beacons.

6 Claims, 7 Drawing Sheets

(56) References Cited

OTHER PUBLICATIONS

"International Search Report and Written Opinion Received mailed Feb. 9, 2022", 11 pages.

Banerjee, et al., "Drop-in additives for suspension manipulation: Colloidal motion induced by sedimenting soluto-inertial beacons", Jul. 2, 2020.

Banerjee, et al., "Soluto-inertial phenomena: Designing long-range, long-lasting, surface-specific interactions in suspensions", Department of Chemical Engineering, University of California, Santa Barbara, CA 93106, Jul. 7, 2016, 6 pages.

Prieve, et al., "Diffusiophoresis of charged colloidal particles in the limit of very high salinity", Sep. 10, 2019.

* cited by examiner

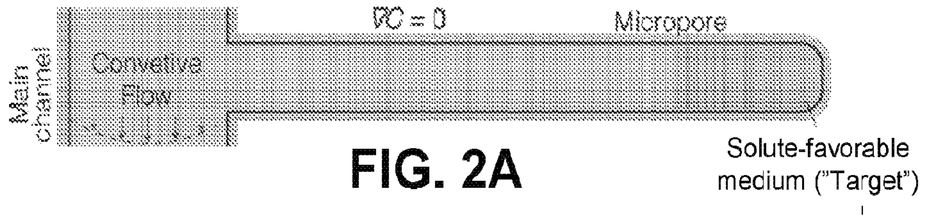
FIG. 2A
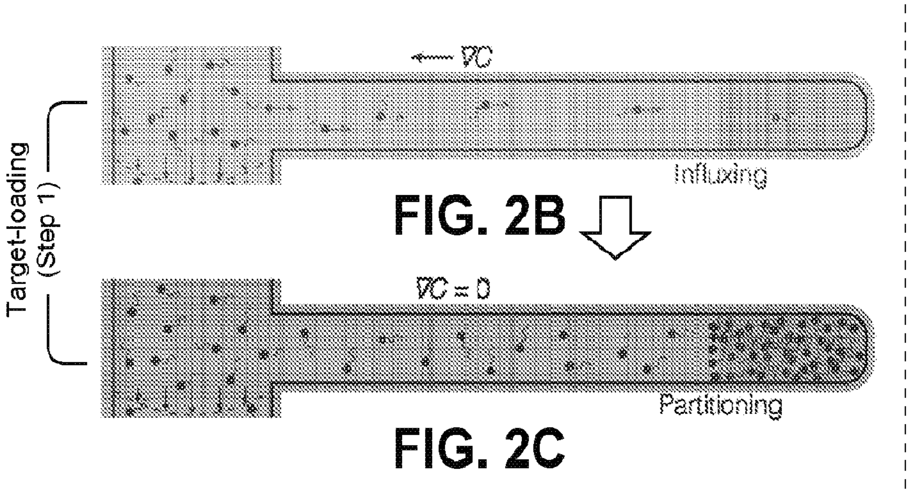
FIG. 2B
FIG. 2C
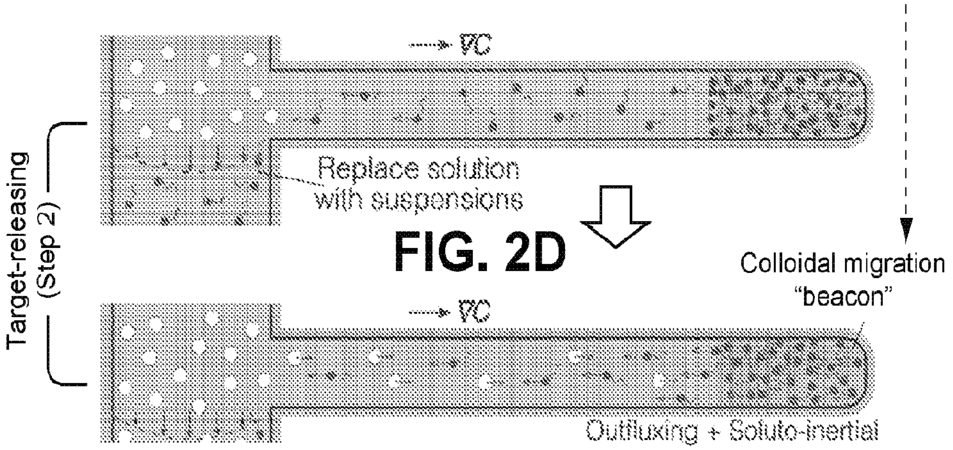
FIG. 2D
FIG. 2E

OBJECT DELIVERY SYSTEMS AND RELATED METHODS

BACKGROUND

Transporting colloidal objects to specific locations within porous media is important for many applications, including drug or cargo delivery, material fabrication, oil recovery, chemical and biochemical sensing, and remediation of polluted soils and waters. Even the delivery of small particles into porous environments remains highly challenging, however, since the low permeability of pore structures heterogeneously slows or even stops the passage of the fluids that suspend these colloids. For example, it is often difficult or impossible to force a fluid to flow into some areas within porous media, such as dead-end pores or small pores that require extremely high pressure to force a fluid through them. While delivery of particles to these and other areas may proceed by diffusion, the timescale required for the particles to diffuse to the desired area may be prohibitively long. For example, suspended colloids may traverse porous media via Brownian motion, this mechanism is impossibly slow in that micron-diameter particles may take about a month to diffuse even 1 millimeter. Even more challenging is that, in most cases, the specific location of targets is generally not known, and often cannot be determined from outside.

SUMMARY

According to one or more aspects of the invention, an object delivery system may include a solute selected to diffuse through at least a portion of a porous material to a target and to associate with the target to form a source beacon capable of generating a solute outflux; and an object to be delivered to the target, wherein the solute outflux causes the object to migrate towards the target.

According to one or more aspects of the invention, a method of using an object delivery system may include one or more of the following steps: loading a target with a solute to form a source beacon, wherein the target is located within a porous material; releasing the solute from the source beacon to produce a solute outflux, wherein the solute outflux causes an object to migrate towards the target; and reloading the target with solute one or more times to form one or more additional source beacons.

BRIEF DESCRIPTION OF THE DRAWINGS

FIGS. 2A-2E is a schematic diagram of a system and method for targeted colloidal migration: (A) a micropore branches off from the main channel, where convective flows are applicable; there is a solute-favorable medium (e.g., a target) placed at the end of the micropore, where it is initially in an equilibrium state; (B) in a target loading step, solution is flowed through the main channel to create a diffusion influx of the solute towards the target, until (C) reaching a new equilibrium with a solute-saturated target in the micropore; (D) in a target releasing step, the solution in the main channel is replaced by flowing a colloidal suspension to build up a solute flux out of the micropore, after which (E) the solute-saturated target sustains the gradient of solute outfluxing, leading to a continuous colloidal movement towards the target such that the solute-favorable target becomes a beacon for the colloidal migration, according to one or more embodiments of the present disclosure.

DETAILED DESCRIPTION

Discussion

The present invention relates to object delivery systems and related methods that enable the delivery of objects (e.g., particles) to targets located within porous media. The delivery of objects to the target may occur autonomously and/or selectively (e.g., the objects may be directed along paths that lead specifically and/or directly to the target), without requiring any knowledge of the specific location of the targets within the porous media (e.g., the location of the targets within the porous media may be hidden, unknown, and/or inaccessible). In addition, the objects may be delivered to targets at a rate that is orders of magnitude faster than the rate of diffusion, which in many instances is prohibitively long. The object delivery systems and related methods are general and may be utilized in any application involving the delivery of objects to targets. For example, objects that may be delivered using the systems and methods disclosed herein include, without limitation, solids, particles, droplets, bubbles, proteins, enzymes, viruses, microcapsules, vesicles, and the like. These objects, among others, may be delivered to targets located in any porous media including, for example and without limitation, oil reservoirs, living tissue, brain, skin, polymeric materials, textiles, carpets, fabrics, construction materials (e.g., concrete, cement, grout, drywall, wood, etc.), paper, leaves, hair, and the like.

Figure 1:
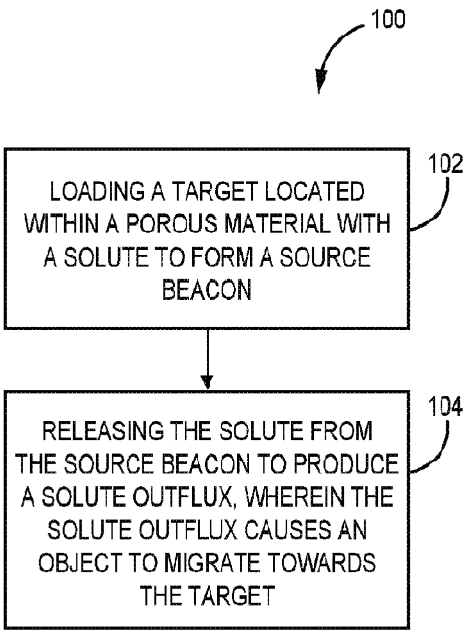
FIG. 1 is a flowchart of a method of using an object delivery system, according to one or more embodiments of the invention.

Embodiments of the present disclosure thus include object delivery systems and related methods, including methods of using object delivery systems. In some embodiments, an object delivery system may include a solute selected to diffuse through at least a portion of a porous material to a target and to associate with the target to form a source beacon capable of generating a solute outflux; and an object to be delivered to the target, wherein the solute outflux causes the object to migrate towards the target. In some embodiments, a method 100 of using an object delivery system may include one or more of the following steps: loading 102 a target with a solute to form a source beacon, wherein the target is located within a porous material: releasing 104 the solute from the source beacon to produce a solute outflux, wherein the solute outflux causes an object to migrate towards the target; and reloading 106 (not shown) the target with solute one or more times to form one or more additional source beacons. See, for example, FIG. 1 which is a flowchart of the method 100 of using an object delivery system, according to one or more embodiments of the invention.

The object delivery systems and related methods may be based on a two-step strategy involving a solute loading step and an object delivery step. The solute loading step may include bringing a porous media and a first solution containing a solute into fluid communication with each other (e.g., sufficient for the solute to associate with the target). The solute may be selected to partition or associate strongly with the target such that the target becomes concentrated in solute, forming a source beacon. The manner in which the porous media and the first solution are brought into fluid communication is not particularly limited and may include any technique suitable for enabling the solute to be transported to the target via any transport mechanism, including, for example and without limitation, one or more of diffusion and fluid flow, among other transport mechanisms. For example, the solute loading step may include and/or proceed by one or more of flowing, contacting, immersing, dipping, applying, flooding, passing, injecting, feeding, attaching, connecting, and the like. In some embodiments, the solute loading step includes flowing the first solution through, proximal to, and/or adjacent to one or more of the porous media, the target, and the pores, and/or contacting (e.g., flooding) the porous media with the first solution. By bringing the first solution and the porous media include fluid communication, the solute may partition and/or associate with the target to form the source beacon.

The object delivery step (e.g., particle delivery step) may include bringing the porous media and a second solution containing an object (e.g., a suspension of particles), which is to be delivered to the target, into fluid communication with each other. The manner in which the porous media and the second solution are brought into fluid communication is not particularly limited and may include any technique suitable for enabling the object to be delivered to the target. For example, the object delivery step may include and/or proceed by one or more of flowing, contacting, immersing, dipping, applying, flooding, passing, injecting, feeding, attaching, connecting, and the like. In some embodiments, the object delivery step includes flowing the second solution through, proximal to, and/or adjacent to one or more of the porous media, the target, the source beacon, and the pores, and/or contacting (e.g., flooding) the porous media with the second solution. By bringing the second solution and the porous media into fluid communication, the second solution may replace (e.g., displace) the first solution, causing solute which permeated the porous media (e.g., but which does not associate with the target) to diffuse out of the area proximal to the target. The removal of said solute may generate an outward flowing solute outflux sustained by (e.g., emanating from) the source beacon and lasting longer than timescales for solute diffusion. The objects in the second solution may be selected to migrate up fluxes of the solute via, for example and without limitation, diffusiophoresis (DP) and/or soluto-capillary migration. The migration may proceed until the objects are delivered to the target.

The interactions on which the object delivery systems and related methods are based are not particularly limited. In some embodiments, the object delivery systems and related methods are based on a soluto-inertial (SI) interaction. In some embodiments, a soluto-inertial interaction includes structures and/or particles that slowly release a solute into solution to attract and/or repel other particles in suspension via diffusiophoresis. A soluto-inertial interaction may include one or more elements: a source beacon with a high solute capacity that is capable of establishing and maintaining a solute flux over sustained periods of time; a solute that mediates the interaction; and an object, such as particles or colloids, that is responsive to the solute flux and migrates via diffusiophoresis or another suitable mechanism up to solute flux to the target. For example, in a soluto-inertial interaction, a solute is concentrated at or near a target sufficient to form a source beacon. The source beacon may be designed to slowly release solute over relatively prolonged periods of time, thus establishing and maintaining a solute flux. The object, in response to the solute flux, may then migrate via, for example, diffusiophoresis (DP) up or down the solute flux (e.g., towards or away from the source beacon), depending on the specific solute-object surface interaction. Other mechanisms may be utilized herein besides DP including, for example and without limitation, soluto-capillary migration.

In some embodiments, the physico-chemical characteristics of one or more of the solute, the object, and the source beacon are considered when developing an object delivery system for delivering the object to a particular target. The physico-chemical attributes of the target, the mediating solute, and the object (e.g., particle) to be delivered may be chosen so as to work as a system. For a solute to load into a target—and therefore convert it to a source beacon (e.g., a SI beacon)—it should concentrate within the target. The basis for the selection of the solute may include a high partition coefficient, a strong adsorption constant, a strong absorption constant, a strong association constant, and/or some other basis. The object, which may include for example, suspended particles such as droplets, colloids, cells, proteins, and/or viruses, should migrate against these solute fluxes (e.g., a concentration gradient of the solute starting from the source beacon and emanating outwardly therefrom), e.g. via diffusiophoresis, soluto-capillary, or some other mechanism.

As mentioned above, the object delivery systems and related methods are general and may be utilized in any application involving the delivery of objects to targets. In other words, the solutes, the objects, and the porous media (e.g., porous material) are not particularly limited. The solutes, the objects, and the porous media may be characterized by any phase (e.g., solid, liquid, gas, vapor, and combinations thereof). Non-limiting examples of solutes include solvents (e.g., such as butanol), salts, surfactants, polymers, oligomers, monomers, enzyme substrates, dissolved gas, ionic liquids, small molecule solutes such as zwitterions, any chemical compound or molecule, whether organic, inorganic, or a combination thereof, and the like. Non-limiting examples of objects that may be delivered using the systems and methods disclosed herein include solids, particles, droplets, bubbles, proteins, enzymes, viruses, microcapsules, vesicles, and the like. Non-limiting examples of porous media include oil reservoirs, living tissue, brain, skin, polymeric materials, textiles, carpets, fabrics, construction materials (e.g., concrete, cement, grout, drywall, wood, etc.), paper, leaves, hair, and the like.

FIGS. 2A-2E illustrate various aspects of a system and method for targeted colloidal migration, according to one or more embodiments of the invention. A main pore or channel, along which fluid may flow, is shown branching off to a micropore containing a target at a dead end of the micropore (FIG. 2A). The first step presented in FIGS. 2B-2C is a solute loading step in which target-favorable solute may be flowed along the main channel and allowed to diffuse into the micropore towards the target (FIG. 2B), ultimately reaching an equilibrium where the solute is concentrated within the target (FIG. 2C). The second step is a particle delivery step as presented in FIGS. 2D-2E. In the particle delivery step, the colloidal suspension may be flowed through the main channel. The flowing of the colloidal suspension may remove the solute at the mouth of the micropore and initiate a diffusive outflux of solute that is sustained by the soluto-inertial beacon (e.g., target concentrated with solute) (FIG. 2D). The suspended particles may then migrate up this solute gradient—e.g. by soluto-capillary or diffusiophoresis-naturally following the chemical flux to ultimately reach the target (FIG. 2E).

Figure 3A:
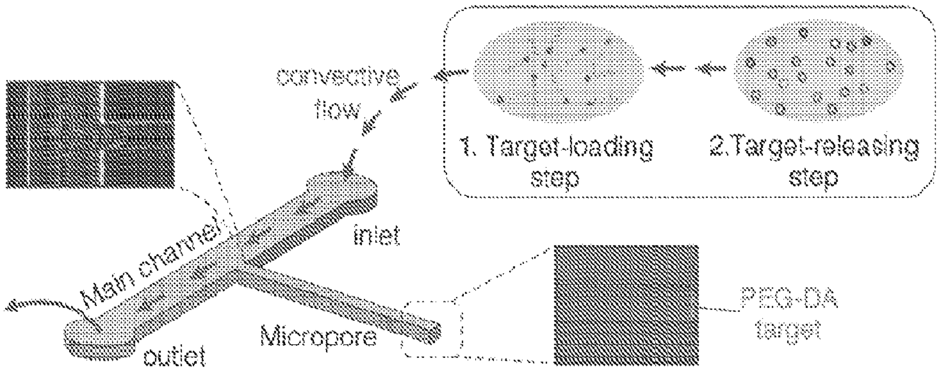
FIGS. 3A-3E illustrate an enhanced and prolonged colloidal migration towards a target: (A) a polyethylene glycol-diacrylate (PEG-DA) target was photopolymerized within a micropore and the colloidal streamlines along the main channel indicate no effective convection into the micropore; (B)-(E) are chronophotographic pictures of silicone oil droplets with color-coding to time display their locomotion in the first 10 min (color bar CB-1) and another 10 min after 3 hours (CB-2) by performing four different approaches: (B) solute-gradient-enhanced colloidal motion by the proposed strategy, i.e., preloading of 600 mM butanol solution to a target-placed micropore for 3 h; (C) solute-gradient-enhanced colloidal motion by preloading of 600 mM butanol solution to a micropore without a target for 3 h; (D) Brownian motion without a target; and (E) Brownian motion with a target, wherein the images in the far right column at 3 h highlight the enhanced and prolonged colloidal locomotions in (B), according to one or more embodiments of the present disclosure.
Figures 3B, 3C, 3D, 3E:
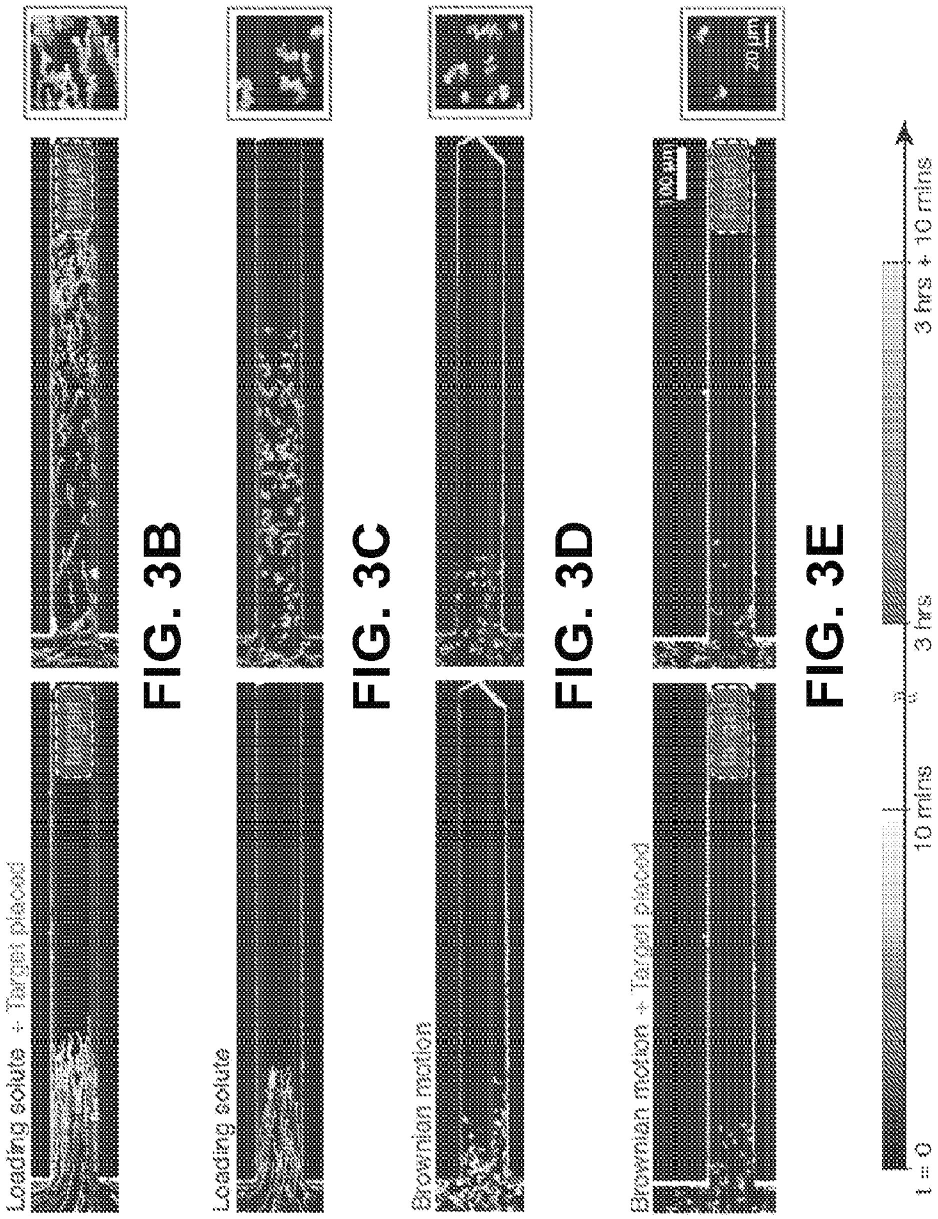

FIGS. 3A-3E illustrate various aspects of a system and method applied to a single micropore branched from a main channel, wherein the target included polyethylene glycol diacrylate (PEG-DA), the solute included butanol, and the object included silicon oil drops, according to one or more embodiments of the invention. A microfluidic device having a T design was utilized, wherein the microfluidic device included a main channel (e.g., width 450 μm, height 20 μm) connected to a straight dead-end sub-channel (e.g., length L1=1500 μm, width 150 μm, height 20 μm), as illustrated in FIG. 3A. The PEG-DA target (e.g., length L2=300 μm) was photopolymerized at the end of the sub-channel. Initially, the entire channel system was filled with water. During the target loading step, a 600 mM butanol solution was flowed through the main channel for 3 h. Switching the flow in the main channel from the butanol solution to a suspension of silicon oil drops initiated the particle delivery step. Butanol diffused out of the micropore and was convected away along with the main channel flow; the butanol flux was maintained by the soluto-inertial release from the source beacon which included butanol concentrated at or near the PEG-DA target. The silicon oil drops migrated up (e.g., against) the butanol gradients towards the target. Droplet streaklines in FIG. 3B show clear, directed migration towards the target, during the first ten minutes (left) and even after three hours (right).

FIGS. 3C-3E show control experiments confirming that the two-step strategy worked as intended. For example, the solute, when loaded into a pore, required some time to unload, even if that pore contained no target to sustain the solute outflux. It was thus expected that particles would migrate into the empty pore, against the solute flux, during the conventional diffusion time scale, but not over the longer soluto-inertial time scale. FIG. 3C confirmed this expectation, showing that, after an 'empty' channel (e.g., a channel without a target) was loaded with a solute via a solute-loading step, droplets initially migrated into the pore, but stop long before reaching the end of the pore. This was contrary to FIG. 3B, where the loaded target sustained the butanol gradient over the much longer SI period of time, continually attracting droplets even after several hours. To confirm that the initial delivery of particles into the empty pore was driven by the transient outflux of solute, FIG. 3D shows the particle delivery step without any solute-loading step. Brownian motion, rather than directed migration, was observed. While in theory it is possible that the target itself may leach out some solute that drives the colloidal migration-rather than the solute that was externally introduced—FIG. 3E does not support that possibility. More specifically, FIG. 3E shows a pore that contains a target, for which no solute-loading step was applied, and instead flowed the droplet suspension. Brownian motion alone resulted, indicating that directed delivery requires the solute to be loaded.

The behavior of the solute may involve the first step in which the target is loaded with solute and effectively converts it into a soluto-inertial beacon. During the particle delivery step, the solute-loaded target sustains a solute outflux, directed from the target towards the mouth of the pore. The delivery process may require that particles migrate up solute gradients (e.g., solute concentration gradients), against the solute outflux maintained by the target. Suspended particles, molecules, and droplets may migrate in response to solute gradients through various mechanisms, including without limitation diffusiophoresis, thermophoresis, thermocapillary, and soluto-capillary migration. The silicon oil drops may be delivered to targets using soluto-capillary migration: the solute is surface-active on the oil/water interface, so that solute gradients cause surface tension gradients along the droplet surface, driving a surface flow along the droplet that propels it up the surfactant gradient. Soluto-capillary migration may be characterized by a droplet migration speed that is proportional to the solute gradient.

FIGS. 4A-4F illustrates various aspects of a system and method applied to a microchannel branching network, according to one or more embodiments of the invention. The microchannel branching network provided a more complex porous geometry that the microfluidic device of FIGS. 3A-3E and was selected to demonstrate that the methods disclosed herein specifically, directly, and rapidly deliver particles to hidden targets. More specifically, the microfluidic device of FIGS. 4A-4F replaced the simple, straight dead-end pore of FIGS. 3A-3E with a hierarchically-branched microfluidic pore. Particles driven into this pore were faced with multiple equivalent options, only one of which leads to the target. Six identical dead-ends terminated the model pore, with a PEG-DA target placed in one of said dead-ends, a decane 'anti-target' (for which the butanol partition coefficient P<1) placed in another dead-end, and the remaining four dead-ends were empty without any target. Notably, the 3.3 mm distance between the main channel and the target would take one-micron particles more than 8 months to reach the target by diffusion alone. In addition, butanol was used as the solute, PEG-DA was used as the target, and silicon oil droplets were used as the object. The solute loading time was estimated and maintained for the estimated duration, after which the particle loading step was initiated.

Figure 4A:
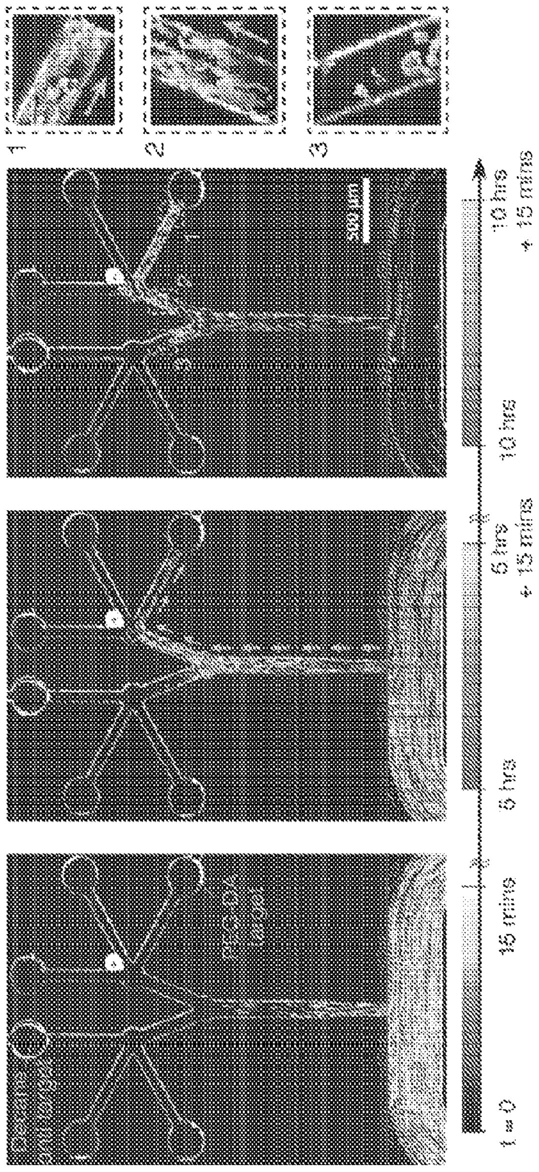
FIGS. 4A-4F illustrate delivering colloids to a target hidden within a micro-channel branching network: (A) chronophotographic pictures of the network display the colloidal 15 min locomotion at 0, 5, and 10 h, demonstrating the colloidal delivery specifically to the target instead of the anti-target, where the zoom-in images at 10 h highlight the persistence of the targeted migration; (B) a schematic illustration of the network names the segments of the branching network for a diffusion simulation, where the partition coefficient (P) is P=10 for the target, and P=0.5 for the anti-target; (C) a simulation snapshot of the solute distribution in the network at 10 h uncovers different distributions among equivalent branches, where the red arrows indicate the route of the maximum gradient starting from the entrance, consistent with the experimental demonstration; (D)-(E) graphical views of a concentration comparison among the same level segments confirms the maximum-gradient route; and (F) a series of simulation snapshots at two intersections (labeled in (C)) displays the evolution of the gradient field, according to one or more embodiments of the present disclosure.
Figure 4B:
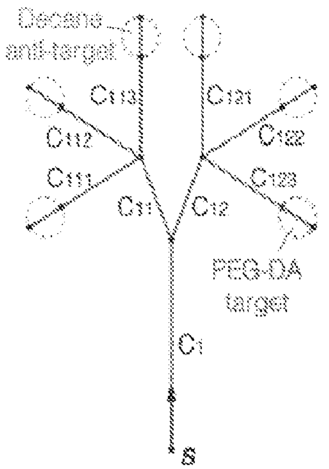

FIG. 4A shows chronophotographic images of the colloidal droplet migration during three different quarter-hours: the first fifteen minutes of the particle delivery step (left), after five hours (middle), and after 10 hours (right). Droplets migrated more than 1 mm during the first fifteen minutes of the delivery step—but not far enough to reach the first branch. After 5 hours, by contrast, droplets had reached the target and the droplets had overwhelmingly migrated down the pore containing the PEG-DA target. Particles (e.g., the silicon oil droplets) continued to migrate towards the target even after ten hours. The few droplets that migrated down a microchannel that did not include the PEG-DA target exhibited simple Brownian motion; they did not exhibit any directed migration. In other words, droplets were driven only towards the hidden target (e.g., the PEG-DA target)—not towards the anti-target, nor towards the empty pores.

Figure 4C:
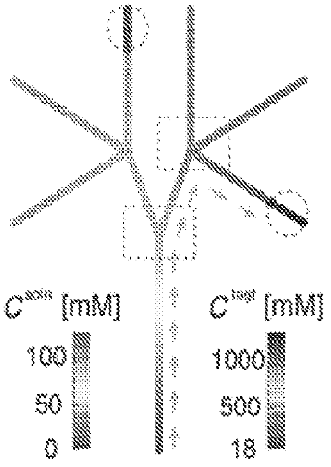
Figure 4D:
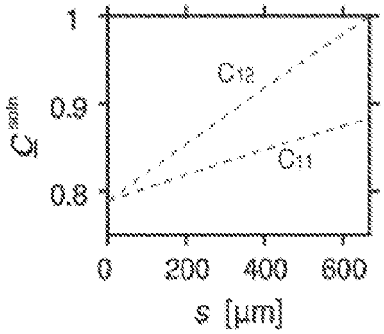
Figure 4E:
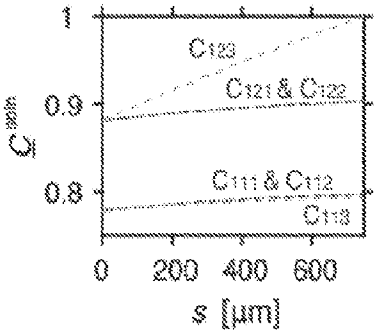
Figure 4F:
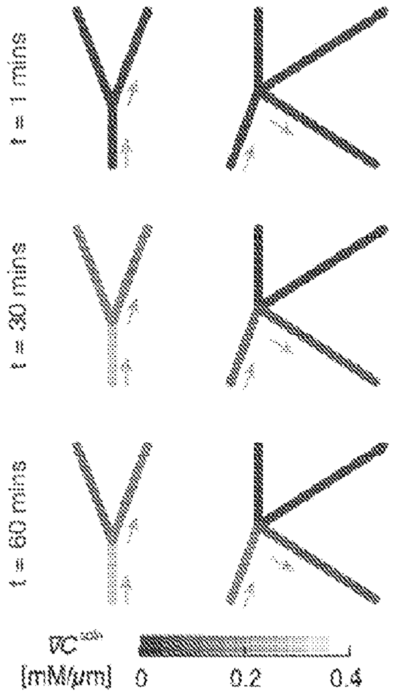

Numerical computations of diffusive solute dynamics in an analogous branched network (FIG. 4B), provided additional insight into the experimental results (partitions coefficients of 0.5 and 10 were assumed for the anti-target and target, respectively). FIG. 4C shows concentration fields after 10 hours (note different scales for the solution, target, and anti-target). Arrows indicate the route with the highest solute gradient, which was the route taken by the colloids in the experiments (FIG. 4A). Normalized solute distributions along different branches are compared in FIG. 4D. The steep rise in solute concentration in secondary branch C12, compared to C11, was responsible for the preferential migration around C12, whereas the slight gradient along C11 attracted some particles. The difference was more stark against the tertiary branches: the branch C123 leading to the target had the strongest solute gradient, whereas minimal solute gradients persisted in the other tertiary branches, whether leading to the anti-target (C113) or to an empty pore. The concentration in branches C121 and C122 were set by the branch point C123 and were therefore uniformly higher than the other three C111, C112 and C113. Notably, the gradients within each of the non-target branches were essentially identical, and negligible. The relative strength of these gradients was established within the first hour of the target-releasing step (FIG. 4E).

According to some embodiments, an object delivery system may include a solute selected to diffuse through at least a portion of a porous material to a target and to associate with the target to form a source beacon capable of generating a solute outflux; and an object to be delivered to the target, wherein the solute outflux causes the object to migrate towards the target.

In some embodiments, the solute and the target associate by one or more of partitioning, adsorption, and absorption. In some embodiments, partitioning may include a solute for which it is energetically more favorable for solute molecules to dissolve in, or be dissolved by, a target than by a solution phase. In some embodiments, a partition coefficient is a ratio of the concentration of solute in the target to the concentration of solute in the solution phase.

In some embodiments, the location of the target within the porous material is unknown, a dead-end pore, or a pore in which a fluid must be under pressure to flow through said pore.

In some embodiments, the solute is included in a first solution which is brought into fluid communication with the porous material for transport to the target. In some embodiments, the source beacon is formed when the association of the solute with the target equilibrates.

In some embodiments, the concentration of the solute within the source beacon is greater than the concentration of the solute in a neighboring solution.

In some embodiments, the object is included (e.g., suspended, emulsified, bubbled, or mixed) in a second solution which is brought into fluid communication with the porous material.

In some embodiments, the second solute removes permeated solute by convection from areas near the target to initiate the solute outflux.

In some embodiments, the object migrates up the solute outflux via one or more of diffusiophoresis and soluto-capillary migration.

In some embodiments, the solute outflux directs the object to the target to the substantially exclusion of areas not including the target.

In some embodiments, the object is delivered to the target at a rate that is greater than the rate of diffusion.

In some embodiments, the target and the object, before said object is delivered to the target, are greater than 100 nm apart.

In some embodiments, the object includes one or more of solids, droplets, bubbles, polymers, colloids, enzymes, cells, proteins, viruses, drugs, oil-liberating agents, microcapsules, and vesicles.

In some embodiments, the object includes suspended colloids (e.g., colloidal suspensions). In some embodiments, the object includes particles in a suspension.

In some embodiments, the porous material includes one or more of oil reservoirs, gas reservoirs, films, coatings, living tissues, brain, skin, polymeric materials, textiles, carpets, fabrics, concrete, cement, grout, drywall, wood, paper, leaves, and hair.

In some embodiments, the solute includes one or more of salts, surfactants, polymers, enzyme substrates, dissolved gas, solvents (e.g., butanol), small molecules (e.g., zwitterions), and combinations thereof.

According to some embodiments, a method of using an object delivery system may include one or more of the following steps: loading a target with a solute to form a source beacon, wherein the target is located within a porous material: releasing the solute from the source beacon to produce a solute outflux, wherein the solute outflux causes an object to migrate towards the target; and reloading the target with solute one or more times to form one or more additional source beacons.

In some embodiments, loading the target with the solute to form the source beacon includes bringing a first solution including the solute and the porous material into fluid communication (e.g., sufficient to associate the solute with the target).

In some embodiments, releasing the solute from the source beacon to produce the solute outflux includes bringing a second solution including the object and the porous material into fluid communication. In some embodiments, releasing the solute from the source beacon to produce the solute outflux includes removing solute at the pore mouth.

In some embodiments, the second solution removes permeated solute by convection from areas near the target to initiate the solute outflux.

In some embodiments, the objects are designed to migrate up concentrate gradients of the emitted solute, autonomously migrating against the solute fluxes emitted by the targets, thereby following chemical trails that lead to the target.

In some embodiments, the hidden targets are converted into source beacons, such as soluto-inertial beacons, that establish, maintain, and/or sustain a solute outflux for extended durations (e.g., durations longer than timescales for solute diffusion).

In some embodiments, the object includes one or more of a solid, droplet, bubble, polymer, colloid, enzyme, cell, protein, virus, drug, oil-liberating agent, microcapsule, and vesicle.

In some embodiments, the solute includes one or more of a salt, surfactant, polymer, enzyme substrate, dissolved gas, solvent (e.g., butanol), and small molecule (e.g., zwitterions).

In some embodiments, the porous material includes one or more of an oil reservoir, gas reservoir, film, coating, living tissue, brain, skin, polymeric material, textile, carpet, fabric, concrete, cement, grout, drywall, wood, paper, leaves, and hair.

According to some embodiments, a method of using an object delivery system may include flowing a first solution including a solute through a porous material sufficient to associate the solute with a target located within the porous material and form a source beacon which is capable of establishing and/or maintaining a solute outflux; and flowing a second solution including an object through the porous material, wherein the second solution initiates the solute outflux and wherein the solute outflux causes the object to migrate towards the target.

As mentioned above, the systems and methods disclosed herein may be utilized in any application requiring delivery of one or more objects to one or more targets within a porous material.

In some embodiments, for example, the systems and methods disclosed herein are used to deliver agents to oil trapped in reservoirs. For example, one or more agents may be included in flood water for various diagnostic purposes, liberating trapped oil, etc. The flood water including the one or more agents may be pumped through a reservoir to a target area. As the flood water is being pumped through the reservoir, it may optionally follow the lowest-resistance pathways through porous rock to the target area. The target area is generally not particularly limited and may include areas of interest for diagnostic purposes and areas within the reservoir in which oil is trapped, among other areas. For example, in some embodiments, the pumping of the flood water may be used to deliver the one or more agents to the target, wherein the target includes areas of the reservoir in which the oil is trapped. The one or more agents may be utilized to analyze the trapped oil for diagnostic purposes and/or liberate the trapped oil. In some embodiments, the pumping of the flood water is further used to displace the oil trapped therein and push it up through another well. In some embodiments, the flood water is flowed through macropores in a reservoir, wherein dead-end pores branch off of the macropores and include the target. In some embodiments, bringing the flood water into fluid communication with the dead-end pores is sufficient to associate the solute with a target located in the dead-end pores, even though the flood water is not able to flow through the dead-end pore (e.g., the solute diffuses to the target).

In some embodiments, the systems and methods disclosed herein are used for drug delivery. For example, a sustained-release reservoir may be embedded within the skin (e.g., subcutaneous). The sustained-release reservoir may be periodically recharged, or reloaded, using the systems and methods disclosed herein. This embodiment and various thereof may be useful in situations in which drugs or other objects cannot be delivered deep into some tissues and/or regions because said tissues and/or regions are inaccessible or difficult to access via blood flow (e.g., across a blood brain barrier, etc.).

In some embodiments, the systems and methods disclosed herein are used in rechargeable films and/or coatings. A functionality (e.g., a scent, a color, a biocide, etc.) may be desired within a film, coating, or other material. A reservoir may be embedded within, for example, a film and periodically reloaded using the systems and methods disclosed herein.

In some embodiments, the systems and methods disclosed herein are used in transdermal applications. For example, in some embodiments, the solute loading step includes applying a wet loading pad to skin sufficient to allow the solute (e.g., a solvent) to diffuse into the skin and load into a target. In some embodiments, the wet loading pad is replaced by a delivery pad containing objects (e.g., drugs, particles, etc.) for delivery to the target.

In some embodiments, the systems and methods disclosed herein include a solute loading step in which a porous material is immersed (e.g., dipped) into a loading solution for a select duration and removed therefrom. In some embodiments, the porous material is immersed (e.g., dipped) into a delivery solution containing an object to be delivered to the target.

What is claimed is:

1. A method of using an object delivery system, the method comprising:

forming a first source beacon by loading a target within a porous material of the object delivery system with a first amount of solute; and producing a first solute outflux enabling an object to migrate towards the target by releasing at least a portion of the first amount of solute from the first source beacon.

2. The method of claim 1, wherein the forming the first source beacon includes associating the first amount of solute and the target by bringing a first solution including the first amount of solute in fluidic communication with the porous material.

3. The method of claim 1, wherein the producing the first solute outflux includes initiating the first solute outflux by removing permeated solute by convection from areas near the target by bringing a second solution including the object in fluidic communication with the porous material.

4. The method of claim 1, wherein the object is selected from the group consisting of a solid, a droplet, a bubble, a polymer, a colloid, an enzyme, a cell, a protein, a virus, a drug, an oil-liberating agent, a microcapsule, and a vesicle; or wherein the solute is selected from a salt, a surfactant, a polymer, an enzyme substrate, a dissolved gas, a solvent, and a molecule; or a combination thereof.

5. The method of claim 1, wherein the porous material is selected from the group consisting of an oil, a gas, a film, a coating, a living tissue, a brain tissue, a skin tissue, a polymeric material, a textile, a carpet, a fabric, a concrete, a cement, a grout, a drywall, a wood, a paper, a leaf, and hair.

6. The method of claim 1 further comprising forming a plurality of source beacons by reloading the target with one or more additional amounts of solute one or more times.

* * * * *